(12) United States Patent
Hardenburger (10) Patent No.: US 6,526,961 B1
(45) Date of Patent: Mar. 4, 2003

(54) CONVEYOR OVEN

(75) Inventor: Paul A. Hardenburger, Hutchinson, KS (US)

(73) Assignee: Lincoln Foodservice Products, Inc, Fort Wayne, IN (US)

( * ) Notice: Subject to any disclaimer, the term of this patent is extended or adjusted under 35 U.S.C. 154(b) by 0 days.

(21) Appl. No.: 09/612,724

(22) Filed: Jul. 10, 2000

(51) Int. Cl.[7] ............................... A21B 1/26; A21B 1/46
(52) U.S. Cl. .................................... 126/21 A; 99/443 C
(58) Field of Search ................ 126/21 A, 41 C; 99/443 C; 417/362, 423.5

(56) References Cited

U.S. PATENT DOCUMENTS

| | | |
|---|---|---|
| 3,884,213 A | 5/1975 | Smith |
| 4,154,861 A | 5/1979 | Smith |
| 4,338,911 A | 7/1982 | Smith |
| 4,377,109 A | 3/1983 | Brown et al. |
| 4,389,562 A | 6/1983 | Chaudoir |
| 4,409,453 A | 10/1983 | Smith |
| 4,438,572 A | 3/1984 | Kaminski |
| 4,457,291 A | 7/1984 | Henke |
| 4,462,383 A | 7/1984 | Henke et al. |
| 4,471,750 A * | 9/1984 | Burtea ...................... 126/21 A |
| 4,474,498 A | 10/1984 | Smith |
| 4,479,776 A | 10/1984 | Smith |
| 4,523,391 A | 6/1985 | Smith et al. |
| 4,539,469 A | 9/1985 | Gigandet |
| 4,554,437 A | 11/1985 | Wagner et al. |
| 4,576,090 A | 3/1986 | Burtea |
| 4,591,333 A | 5/1986 | Henke |
| 4,610,886 A | 9/1986 | Buller-Colthurst |
| 4,615,014 A | 9/1986 | Gigandet et al. |
| 4,626,661 A | 12/1986 | Henke |
| 4,655,126 A | 4/1987 | Wells |
| 4,679,542 A | 7/1987 | Smith et al. |
| 4,717,572 A | 1/1988 | Buller-Colthurst |
| 4,739,154 A | 4/1988 | Bharara et al. |
| 4,750,276 A | 6/1988 | Smith et al. |
| 4,753,215 A | 6/1988 | Kaminski et al. |
| 4,757,800 A | 7/1988 | Shei et al. |
| 4,781,169 A | 11/1988 | Henke et al. |
| 4,831,238 A | 5/1989 | Smith et al. |

(List continued on next page.)

Primary Examiner—Sara Clarke
(74) Attorney, Agent, or Firm—Ohlandt, Greeley, Ruggiero & Perle LLP (57) ABSTRACT

The oven described herein comprises at least one conveyor for carrying food products through a bake chamber to be cooked, a bake chamber with openings for conveyor(s), an air heating, distribution and return system, a fan box that contains means for pressurizing heated air and a drive end that contains the fan motor, conveyor drive motor(s) and oven temperature controls.

The bake chamber, air distribution components, air return components and conveyor(s) are designed so that all components may be easily and quickly removed for cleaning while allowing access for maintenance. Each conveyor has a separate speed control and may travel in either a left to right or right to left direction.

The air heating, distribution and return system features a burner tube mounted at the rear of the fan box, at least one centrifugal fan which rotates on an axis perpendicular to the direction of conveyor travel, return air ducts, a central return air opening between fans (for embodiments with more than one fan) and hot air distribution manifolds for impinging hot air on the top and bottom surfaces of product being cooked. Heated air is provided at the rear of the hot air distribution manifolds.

The oven controls are side-mounted and centrally located to facilitate field service. Each oven is self-contained so it may be stacked with other ovens to provide increased baking capacity in a relatively small volume of kitchen space.

18 Claims, 13 Drawing Sheets

U.S. PATENT DOCUMENTS

| | | |
|---|---|---|
| 4,834,063 A | 5/1989 | Hwang et al. |
| 4,846,143 A | 7/1989 | Csadenyi |
| 4,884,552 A | 12/1989 | Wells et al. |
| 4,947,511 A * | 8/1990 | Brunner .................... 15/312.1 |
| 4,951,648 A | 8/1990 | Shukla et al. |
| 4,960,100 A | 10/1990 | Pellicane |
| 4,964,392 A | 10/1990 | Bruno et al. |
| 4,965,435 A | 10/1990 | Smith et al. |
| 5,025,775 A | 6/1991 | Crisp |
| 5,077,072 A | 12/1991 | Sieradzki |
| 5,078,050 A | 1/1992 | Smith |
| 5,088,391 A | 2/1992 | Anderson |
| 5,094,089 A * | 3/1992 | Lail ........................... 62/429 |
| 5,121,677 A | 6/1992 | Le Claire et al. |
| 5,131,841 A | 7/1992 | Smith et al. |
| 5,147,994 A | 9/1992 | Smith et al. |
| 5,161,889 A | 11/1992 | Smith et al. |
| 5,180,898 A | 1/1993 | Alden et al. |
| 5,205,274 A | 4/1993 | Smith et al. |
| 5,210,387 A | 5/1993 | Smith et al. |
| 5,231,920 A | 8/1993 | Alden et al. |
| 5,253,564 A | 10/1993 | Rosenbrock et al. |
| 5,277,105 A | 1/1994 | Bruno et al. |
| 5,310,978 A | 5/1994 | Smith et al. |
| 5,365,918 A | 11/1994 | Smith et al. |
| 5,398,666 A | 3/1995 | Smith et al. |
| 5,401,940 A | 3/1995 | Smith et al. |
| 5,421,316 A | 6/1995 | Heber |
| 5,421,317 A | 6/1995 | Cole et al. |
| 5,423,248 A | 6/1995 | Smith et al. |
| 5,449,888 A | 9/1995 | Smith et al. |
| 5,454,295 A | 10/1995 | Cox et al. |
| 5,510,601 A | 4/1996 | Smith et al. |
| 5,539,187 A | 7/1996 | Smith et al. |
| 5,584,237 A | 12/1996 | Moshonas |
| 5,606,904 A | 3/1997 | Fabbri |
| 5,671,660 A | 9/1997 | Moshonas |
| 5,717,192 A | 2/1998 | Dobie et al. |
| 5,832,812 A | 11/1998 | Wolfe |
| 5,850,781 A | 12/1998 | Kuenen |
| 5,928,541 A | 7/1999 | Tsukamoto et al. |
| 5,934,178 A | 8/1999 | Caridis et al. |
| 6,065,463 A | 5/2000 | Martin |

* cited by examiner

CONVEYOR OVEN

FIELD OF THE INVENTION

The present invention relates to ovens and, more particularly, to ovens employing an impingement air flow method.

BACKGROUND OF THE INVENTION

Examples of forced air or impingement ovens that use conveyors can be found in the prior art. A dual conveyor oven is disclosed by Smith in U. S. Pat. No. 4,474,498 where dual sets of air manifolds are utilized to provide heated air to two conveyors in an oven cabinet. An impeller arrangement is disclosed that draws return air from the front and exhausts re-heated air vertically into adjacent air manifolds. While effective, this arrangement does not provide a dual conveyor oven with a low profile nor does it provide for the easy and quick removal of the conveyors via a removable front panel. Furthermore, the conveyor speed cannot be individually controlled.

Another dual conveyor oven is disclosed by Wolfe in U. S. Pat. No. 5,832,812, which employs two, side-fed centrifugal fans mounted on a common shaft having an axis parallel to the direction of conveyor travel. This design has inherent problems in shaft vibration during operation due the shaft's length and the fans are difficult to remove for service and cleaning. Furthermore, the style of centrifugal fan in this design creates an air flow pattern that is much more difficult to balance than alternative fan designs. This design also requires the oven to have a deep "footprint" that is not always practical in restaurants. Finally, the burner tube design and location does not provide uniform return air re-heating before air enters the side-fed centrifugal fans along with difficult service and replacement of the burner tube, fans and fan housings.

A single conveyor, stackable conveyor oven is disclosed by Bruno in U. S. Pat. No. 5,277,105 that utilizes two, rear-fed, backward-inclined blade centrifugal fans. The '105 patent discloses a front-mounted burner tube that is mounted perpendicular to the direction of conveyor travel. This burner tube orientation provides uneven and non-uniform heat patterns within the oven cabinet. No provision is made to remove the conveyors quickly and easily. The conveyor wire belt must be removed and the conveyor folded for removal. Each centrifugal fan is driven by an individual electric motor that increases service cost over the life of the unit. The front mounted oven controls disclosed in this patent require dedicated cooling fans to prevent damage from excessive heat build-up that again increase service costs. Finally, this design requires a deep "footprint" that is not always practical in restaurants.

Finally, the stackable conveyor oven disclosed by Crisp in U.S. Pat. No. 5,025,775 utilizes two axial fans with separate motors mounted in the fan box to provide heated air movement. Only three ovens may be stacked to provide only three conveyor levels. As two motors are required per oven, service costs are increased over the unit's service life. Furthermore, no quick and easy conveyor removal method is disclosed. Lastly, the controls are mounted on the side of the bake chamber. In a double or triple stack configuration, heat from the lower ovens rises and damages the sensitive electrical controls again increasing lifetime service costs.

While the prior art yields a number of conveyor oven designs having various axial and centrifugal fan air manifold arrangements, none of these teach the novel features and associated benefits found in the present invention.

SUMMARY OF THE INVENTION

The shortcomings inherent in the prior art are overcome by the present invention, which comprises a low profile, dual conveyor impingement oven having a bake chamber, two conveyor assemblies, a fan box with two centrifugal fans with axes mounted perpendicular to the direction of conveyor travel, two hot air distribution manifolds, six side-mounted, return air ducts and a drive end control unit. Other embodiments include a single conveyor oven with two centrifugal fans or a single conveyor oven with a shorter bake chamber that requires only a single centrifugal fan.

Each conveyor is positioned horizontally in the bake chamber to transport food products from one end to the other. Each conveyor has its own speed control to allow two separate bake times in a single oven. The bake chamber utilizes a cantilever design that allows easy and quick conveyor, air finger and return air duct removal from the front of the oven. When the front panel is removed, complete access is provided for cleaning or maintenance. The bake chamber is mounted to the fan box and may be removed if required for oven installation or maintenance.

The fan box contains two, backward-inclined blade, rear-fed centrifugal fans spaced along the length of the bake chamber. The rotational axis of each fan is perpendicular to the direction of conveyor travel. One electric motor mounted in the drive end provides power to both fans.

A burner tube is mounted at the rear of the fan box. The burner tube has openings to allow heated gas to exit the tube and heat the air being drawn into each fan. The design of the burner tube and the fact that each fan has only a single opening where heated air is drawn provides a much more uniform heat pattern when compared to the prior art.

Heated air is drawn into each fan's inlet, which is operating at low pressure. Centrifugal force is imparted on the air and it is pressurized as it moves outward into each fan's housing. The fan housing operates at a uniform, high pressure. The pressurized air is then directed into the three air fingers that are connected to the fan housing. The air fingers are adapted to distribute the heated air uniformly in the bake chamber on to food products being transported on either the top or bottom conveyor. This novel use of a backward-inclined blade centrifugal fan combined with a fan housing and three hot air fingers provides improved air flow that results in more uniform air distribution to the top and bottom of both conveyors and a uniform heat pattern within the bake chamber.

The bake chamber contains six return air ducts that channel spent cooking air back into the fan box for re-heating. These return air ducts greatly reduce the amount of spent air that escapes through the conveyor openings thereby increasing operating efficiency.

Appropriate control means are located in the drive end. These controls provide electricity to the main fan motor, the conveyor motors, the combustion air motor and control power to the temperature and conveyor time controls and the gas valves.

Due to the invention's low-profile design, it is possible to stack two units and provide a total of four conveyor levels. Furthermore, the novel use of centrifugal fans whose axis of rotation is perpendicular to the direction of conveyor travel allows the ovens front to back dimension or depth to be minimized. Therefore, the present invention provides the maximum baking capacity in the smallest "footprint." In addition to maximizing cooking capacity, menu flexibility is also increased with the ability to cook on four separate conveyors with each operating at a separate speed.

Yet another advantage of the present invention is the ability to quickly and easily remove the conveyors, air fingers and return air ducts for cleaning or service. The removable front panel provides instant access to all components located inside the bake chamber. The side mounted oven controls are located away from the source of heat that will extend their service life. Since all oven controls and motors are located in the drive end, time required to replace any of these components is minimized.

These and other advantages of the present invention are provided below.

DESCRIPTION OF THE DRAWINGS

The following detailed description refers to the attached drawings in which.

DETAILED DESCRIPTION OF THE PREFERRED EMBODIMENT

Figure 1:
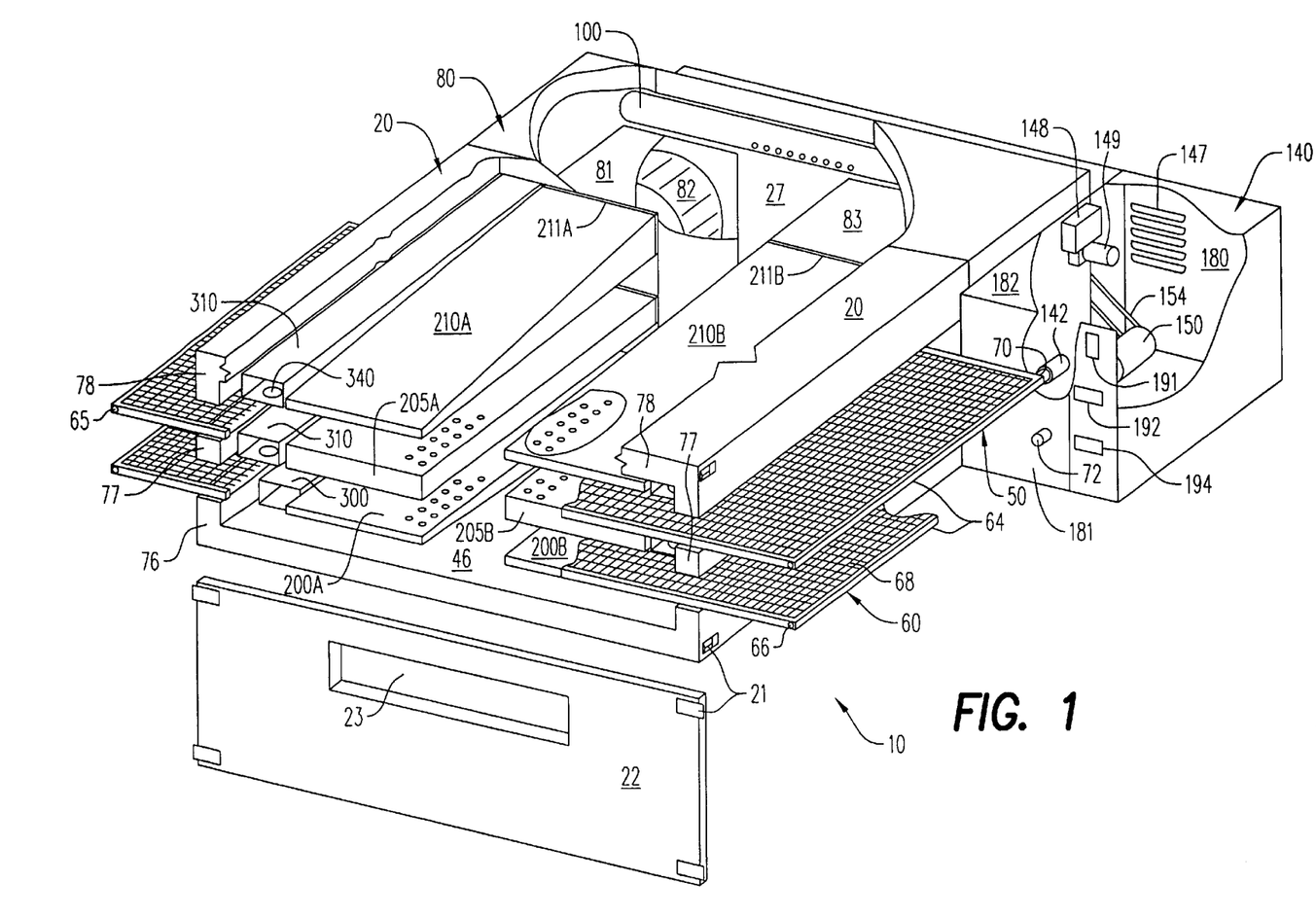
FIG. 1 is a front perspective view of the oven of the present invention with portions cut away for clarity.

The oven 10 of the present invention is shown in FIG. 1. Oven 10 generally includes a bake chamber 20 having front, back, right and left sides; conveyor assemblies 50 and 60; fan box 80, and drive end unit 140.

FIG. 1 shows bake chamber 20 further including a front panel 22, bottom bake chamber 76, middle bake chambers 77, top bake chamber 78. Front panel 22 is held in place by four latch assemblies 21 and is therefore easily removable. Front panel 22 also includes an opening or aperture 23 that allows a product to be placed on the top conveyor at the bake chamber's midpoint.

Figure 3:
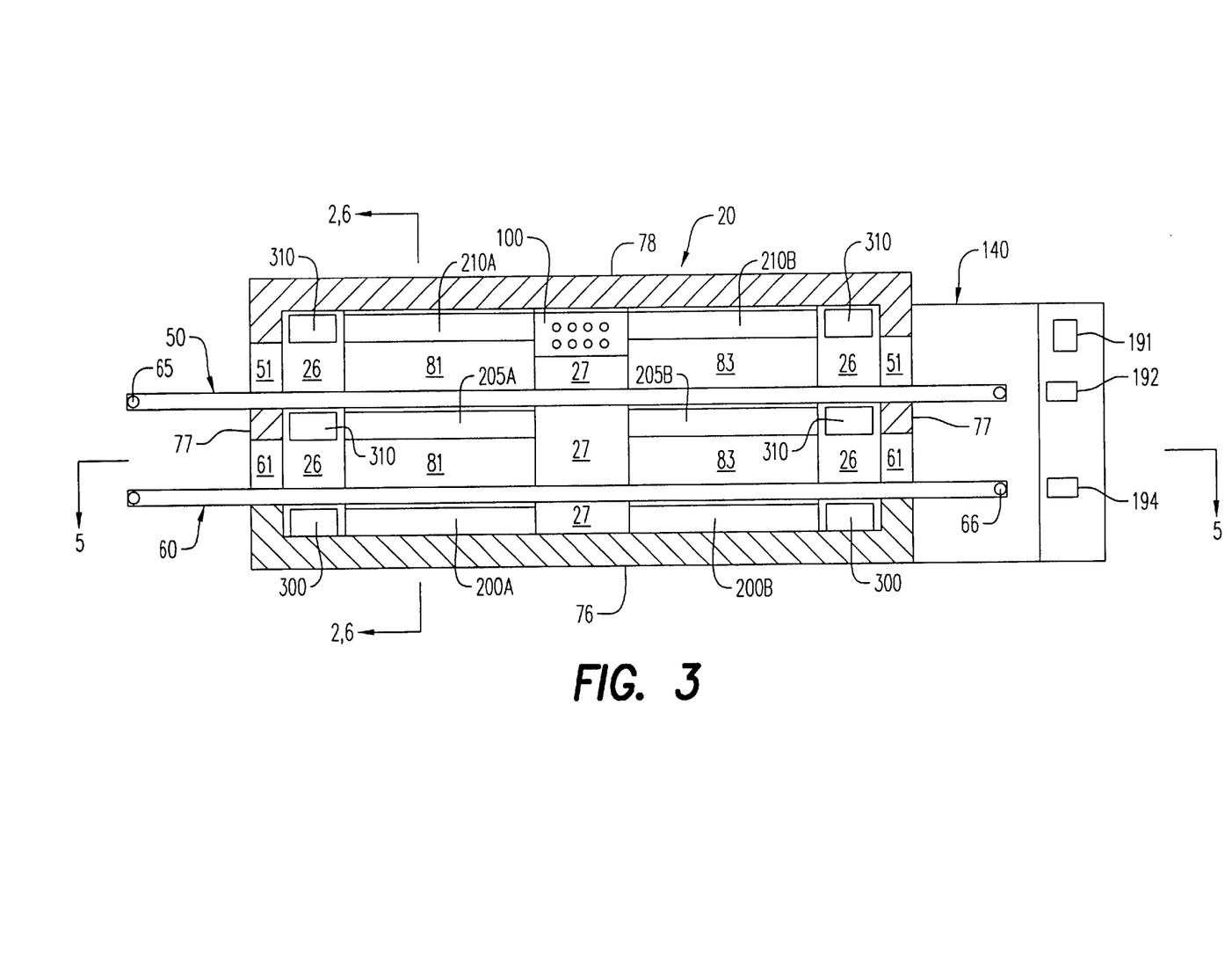
FIG. 3 is a front sectional view taken along line 3—3 of FIG. 5.

The bake chamber top 78 and bake chamber middle 77 sections form two top bake chamber openings 51 (FIG. 3). The bake chamber middle supports 77 provide support to conveyor 50 when installed. The bake chamber middle sections 77 and bake chamber bottom 76 form two bottom bake chamber openings 61 (FIG. 3). The bake chamber bottom 76 provides support to conveyor 60 when installed.

All bake chamber sections are preferably made from thin stainless steel and are hollow. The preferred embodiment utilizes insulating materials within these hollow components. As the oven may be stacked, all bake chamber components must be lightweight yet strong.

Conveyor Assembly Details

As shown in FIGS. 1 and 3, bake chamber 20 includes an upper conveyor assembly 50 and a lower conveyor assembly 60 that are interchangeable in the preferred embodiment. Each conveyor assembly 50, 60 comprises a frame 64 that in turn supports two rotating shafts: drive shaft 66 and idle shaft 65. Wire mesh belt 68 defines a continuous loop around shafts 65 and 66 as a direction of movement thereof. Frame 64 carries a rigid wire frame (not shown) installed between shafts 65 and 66 that further support the wire mesh belt 68.

Figure 12:
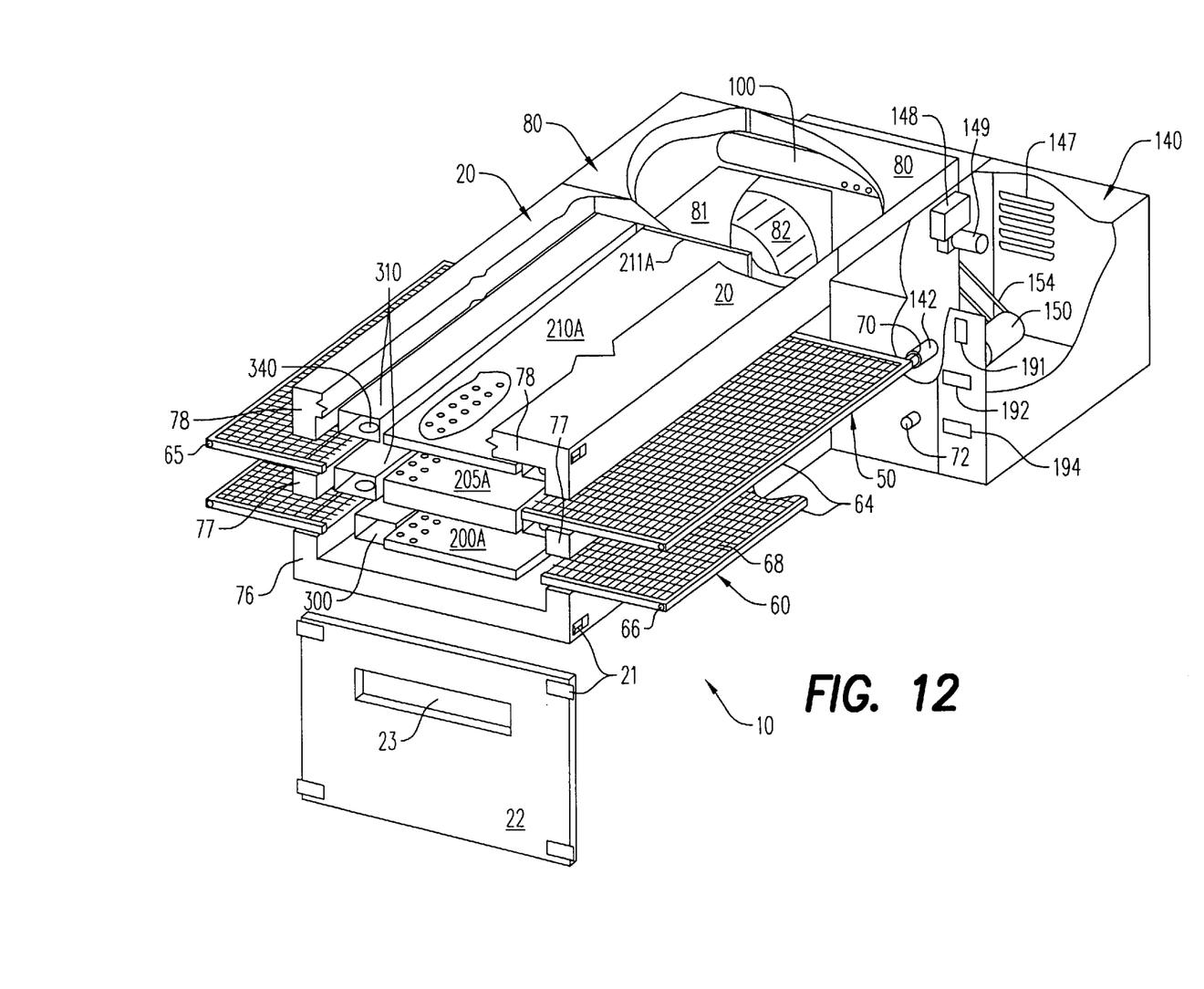
FIG. 12 is a perspective view of another embodiment using a single centrifugal fan and two conveyor levels.
Figure 13:
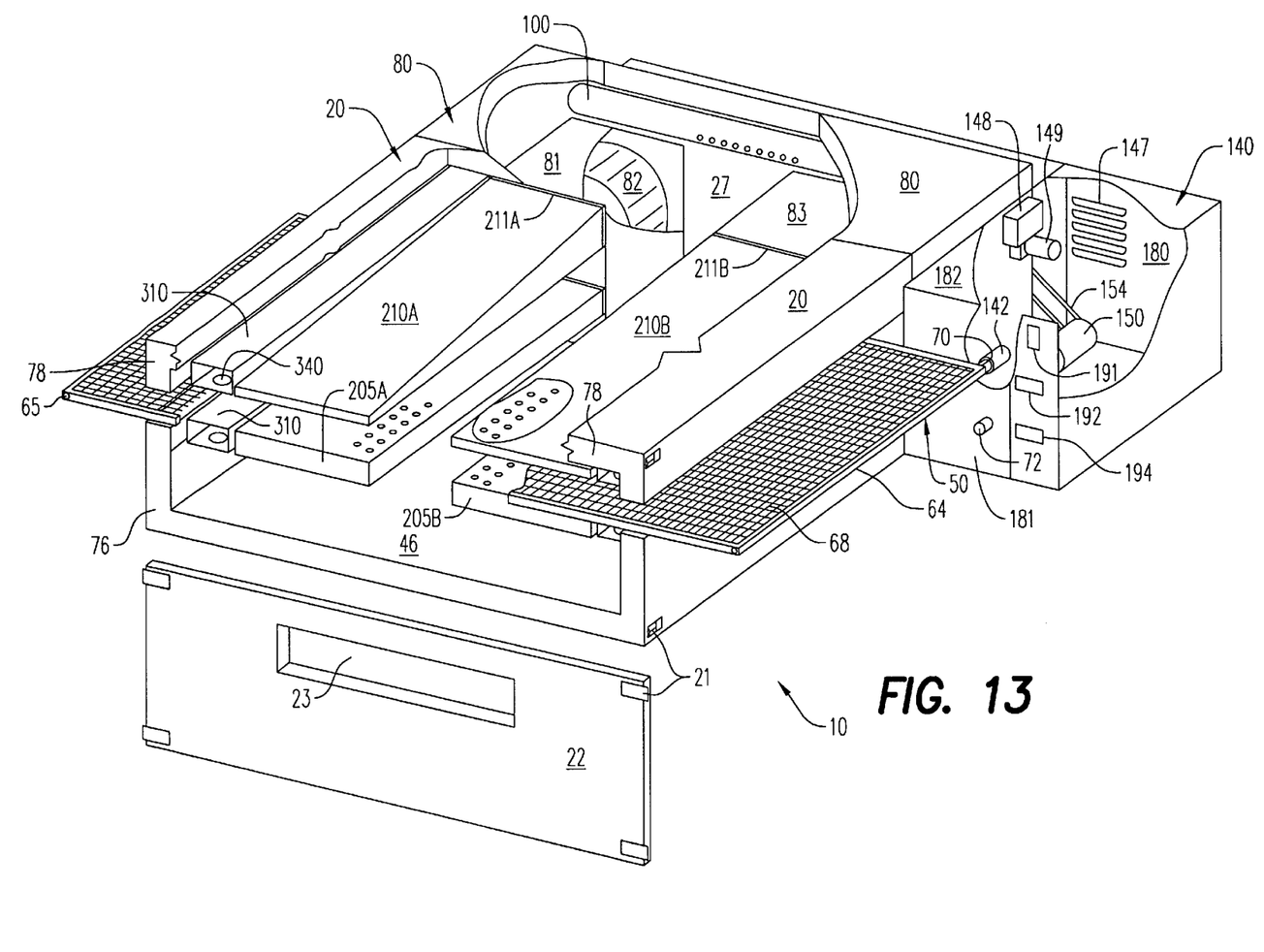
FIG. 13 is a perspective view of another embodiment using two centrifugal fans and one conveyor level.
Figure 14:
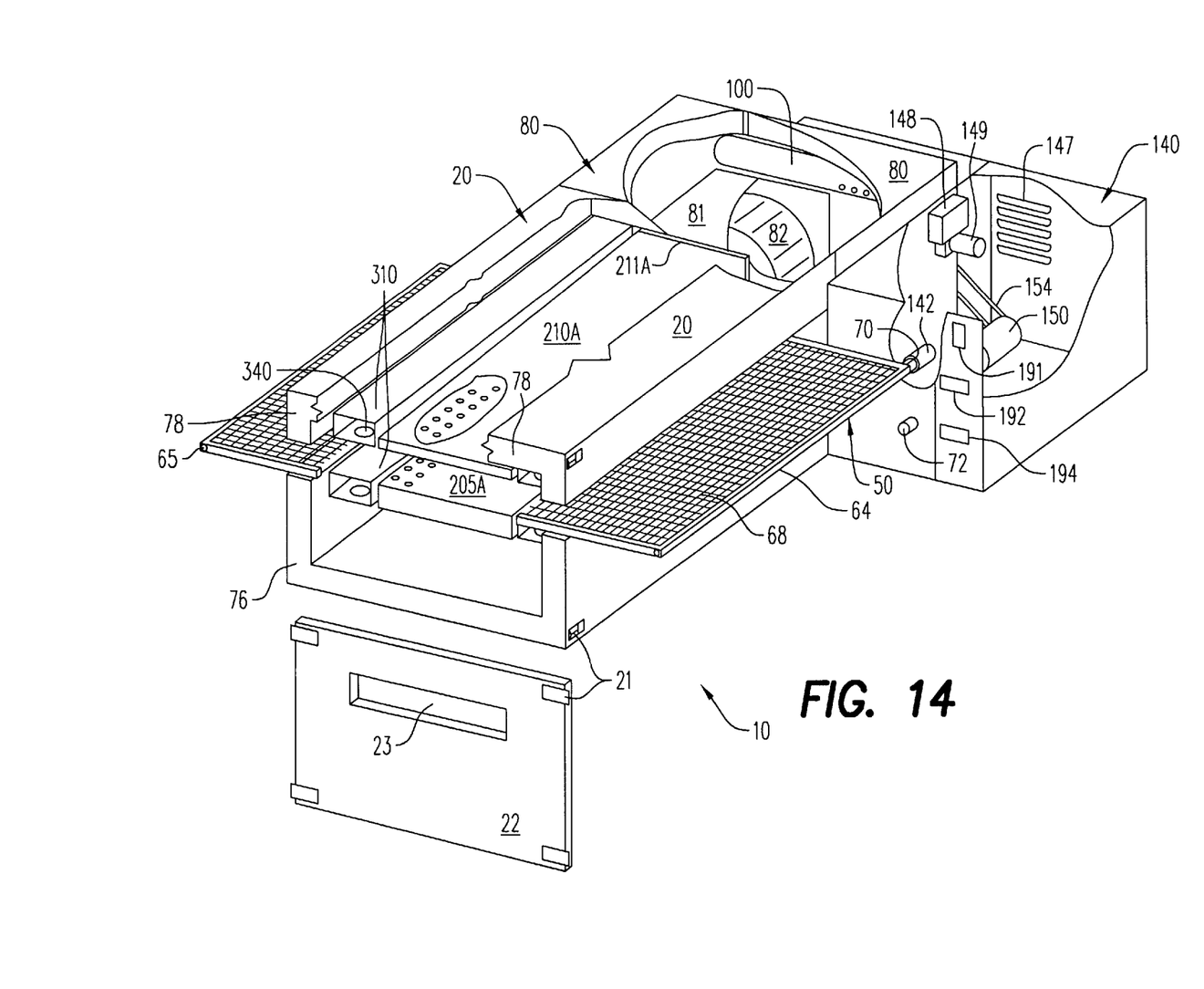
FIG. 14 is a perspective view of another embodiment using a single centrifugal and one conveyor level.

Each conveyor drive shaft has a male, cogged coupling 70 that couples with a female cogged coupling 72 (FIG. 12). The female cogged coupling 72 is connected to a separately controlled conveyor drive motor 142 and 144 described below. Cogged couplings 70 and 72 are adapted for easy engagement and disengagement to facilitate conveyor 50 and 60 removal and reinstallation.

Air Heating, Distribution and Return System

The oven of the present invention as shown in FIGS. 1 and 3 has an air heating and delivery/circulation system that includes a fan box 80, burner assembly 148, burner tube 100, lower return air ducts 300, top and middle return air ducts 310, central return air opening 27, backward-inclined centrifugal drive end fan 84, backward-inclined centrifugal idle end fan 82, drive end fan housing 83, idle end fan housing 81 and the following plenums for evenly distributing hot air: upper fingers 210A and 210B, middle fingers 205A and 205B and lower fingers 200A and 200B.

Figure 5:
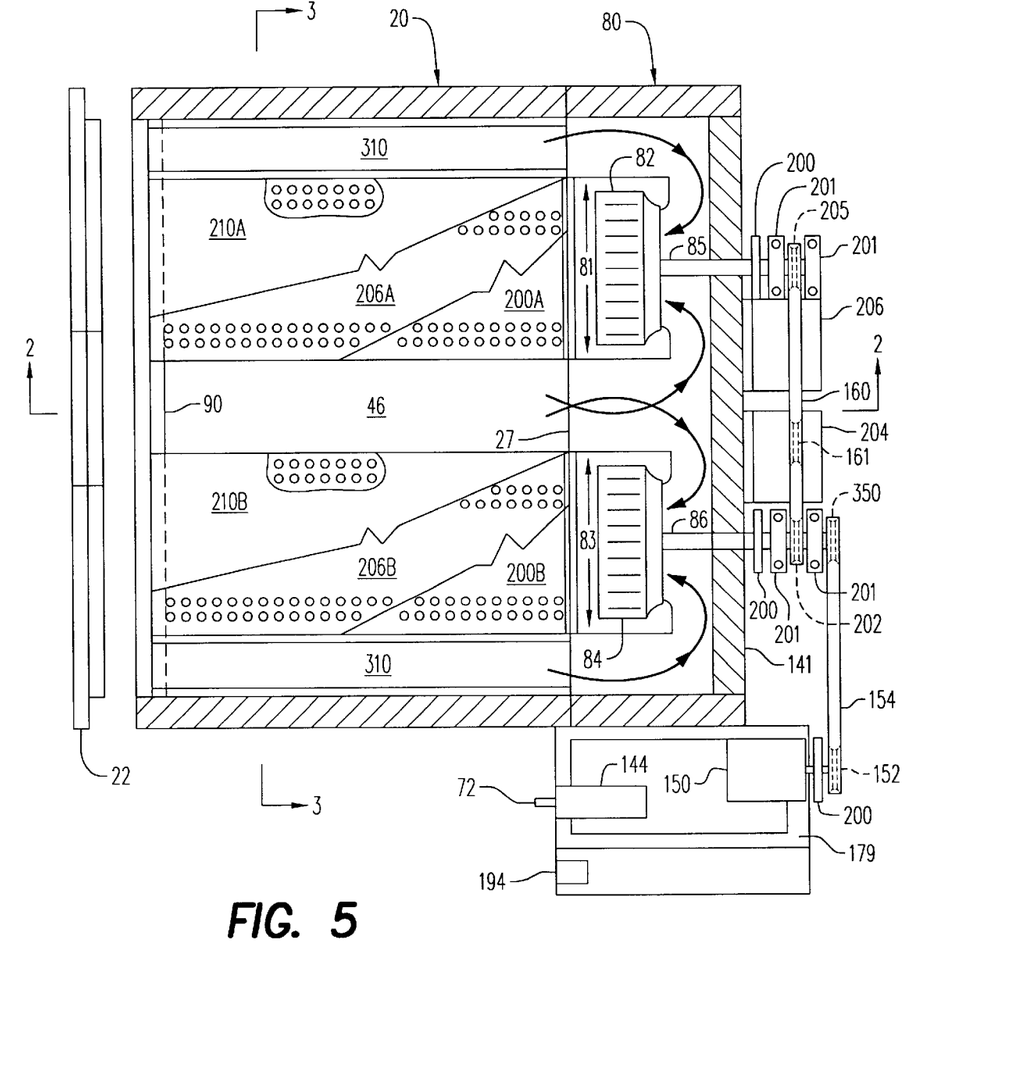
FIG. 5 is an overhead sectional view taken along line 5—5 of FIG. 3.

Fan box 80 is an air-tight chamber that normally operates at a negative pressure and thus draws spent cooking air in through the return air ducts 300 and 310 (FIGS. 1, 3). The return air is then re-heated in the fan box 80 by burner tube 100 before entering the centrifugal fans 82 and 84. Fans 82 pressurize re-heated air and 84 located in their respective fan housings 81 and 83 (FIG. 5). Centrifugal fans 82 and 84 expel a substantially uniform pressure, non-swirling column of air in a forward direction toward air fingers 210A, 210B, 205A, 205B, 200A and 200B.

Figure 6:
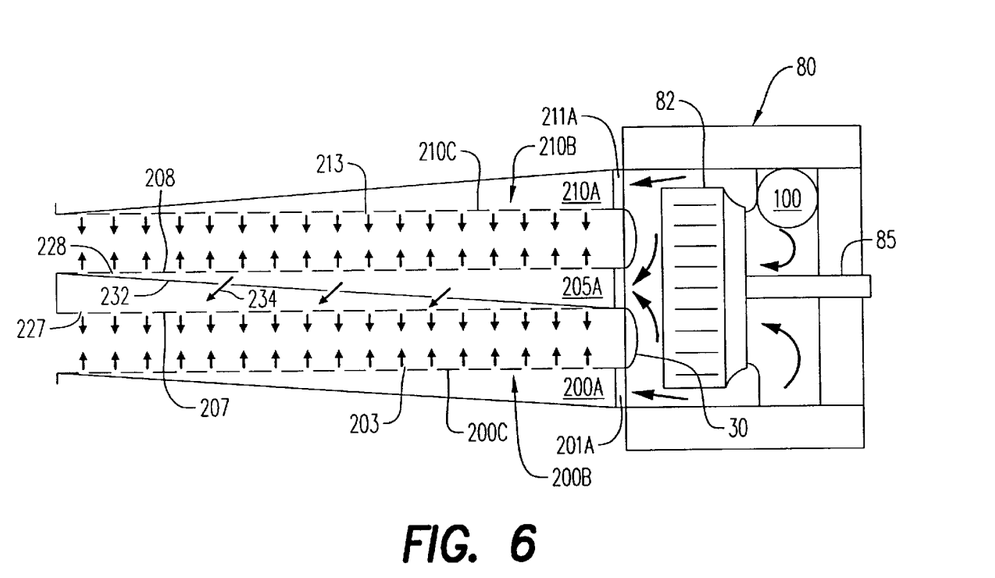
FIG. 6 is a side sectional view taken along line 6—6 of FIG. 3.

FIG. 6 illustrates heated return air entering fan 82 and then being discharged towards the air fingers. The elliptical air guides 30 facilitate air movement by reducing resistance due to their elliptical shape as heated air passes through the fan housing and enters the air fingers.

The preferred embodiment incorporates two identical fan housing arrangements with the central return air opening 27 located between them (FIG. 5). A detailed description of air distribution via air fingers 210A, 210B, 205A, 205B, 200A and 200B follows.

Hot Air Manifold (Finger) Details

Figure 2:
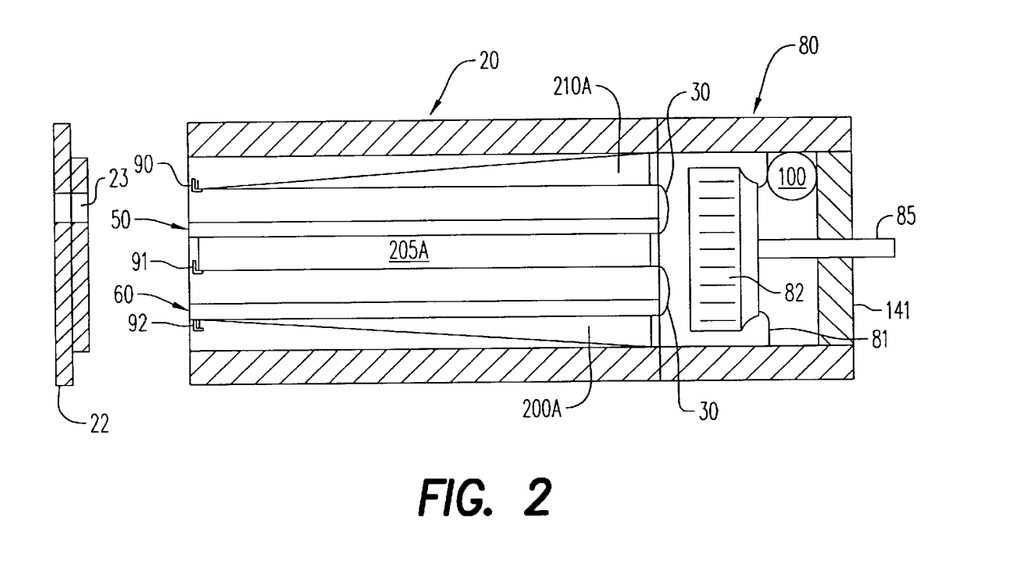
FIG. 2 is a sectional view taken along line 2—2 of FIG. 3.
Figure 7:
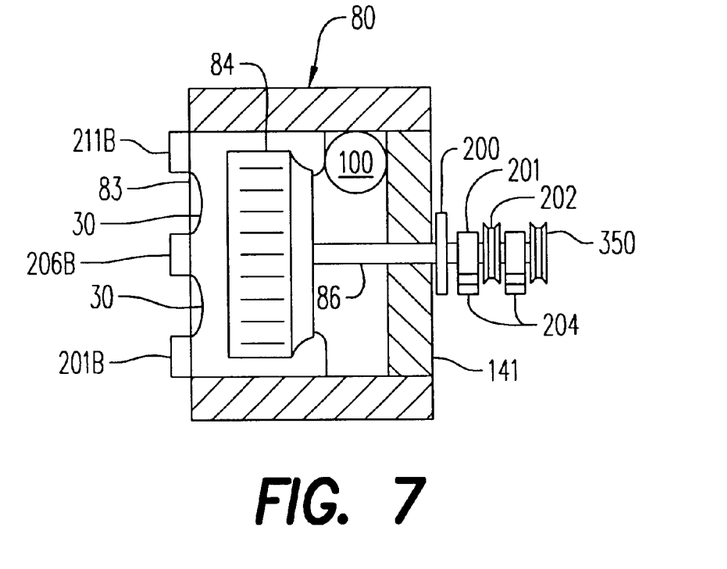
FIG. 7 is a side sectional view taken along line 7—7 of FIG. 4.
Figure 8:
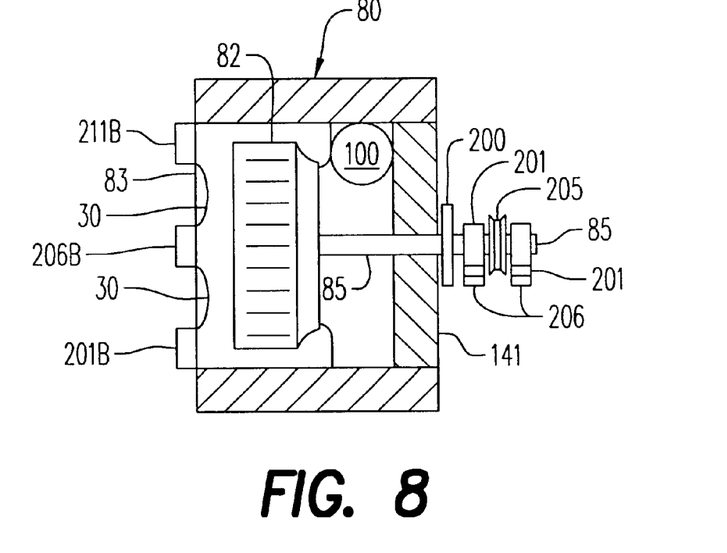
FIG. 8 is a side sectional view taken along line 8—8 of FIG. 4.

FIGS. 1, 2 and 8 illustrate how the idle end hot air manifolds or fingers attach to the idle end fan housing 81. Lower, middle and upper fingers 200A, 205A, 210A slide into corresponding collar joints 201A, 206A, 211A that are fixed to the idle end fan housing. FIG. 7 illustrates collar joints 201B, 206B, 211B for the drive end fingers 200B, 205B and 210B. All fingers are generally tapered, hollow stainless steel enclosures that are open at one end where they are joined with their corresponding collar joint.

While the back of each finger is supported by the collar joint, the front of each finger rests on finger support angles:

top finger support angle 90, middle finger support angle 91 and lower finger support angle 92. All finger support angles are shown in FIG. 2, but are not shown in FIG. 1 for clarity.

The following fingers are interchangeable: Lower finger 200A and 200B, middle finger 205A and 205B and upper finger 210A and 210B. Therefore, only the idle end manifolds will be described in detail. FIG. 6 shows lower manifold 200A comprised of a finger body 200B and an air plate 200C which has a pattern of air holes 203. Middle finger 205A has a lower air plate 207 with air holes 227, an upper air plate 208 with air holes 228 and an internal baffle 232. Internal baffle 232 has a series of holes 234 that allow about ⅓ of the air flow to this finger to travel downward and out through air plate 207. The upper finger 210A is comprised of a finger body 210B and an air plate 210C with air hole pattern 213.

In the preferred embodiment, internal blocking plates are attached to finger air plates as required to adapt the airflow to cook particular types of food product. The overall dimension of the fingers along with the internal blocking plates have been adapted to provide about twice the air flow directed up into the conveyors when compared to the air flow directed down. It should be apparent to those skilled in the art that other manifold configurations could be used to achieve different air distribution characteristics.

Return Air Duct Details

The oven of the preferred embodiment has a means for returning spent cooking air from the bake chamber 20 back to the fan box 80. The use of these return air ducts reduces the amount of spent cooking air that escapes through the bake chamber opening 51 for the top conveyor 50 and the bake chamber opening 61 for the bottom conveyor 60.

FIGS. 1 and 3 illustrate six separate return air ducts: two identical lower return air ducts 300 and four identical top and middle return air ducts 310. FIG. 1 shows the return air ducts at the idle end of the oven installed. Rear wall 26 at the back of the bake chamber 20 has openings to accept the two top return air ducts 310 and the two middle return air ducts 310. Lower return air ducts 300 are placed on the floor of the bake chamber bottom 46. The front of all return air ducts are supported by the finger support angles (top finger support angle 90, middle finger support angle 91 and lower finger support angle 92(FIG. 2)) in the same manner as the front of the hot air manifolds (fingers) are supported.

As illustrated in FIG. 2, in the preferred embodiment, each of the return air ducts are rectangular in shape and made from thin stainless steel sheet metal and are open at each end. Top and middle return air ducts 310 have openings 340 (FIG. 1) in the bottom side while the lower return air duct 300 has no openings. The central return air opening 27, which is only present on embodiments with two fan assemblies, is part of the return air system that improves oven performance.

Centrifugal Fan Drive and Fan Housing Arrangement

The preferred embodiment of the present invention utilizes two rear-fed, centrifugal fan assemblies to provide hot air circulation within the bake chamber 20 and fan box 80. It should be noted that axial fans may be substituted to provide similar results. FIG. 5 shows an overhead sectional view of the preferred embodiment while FIG. 4 illustrates the rear of the fan box.

Drive end 84 (FIG. 4) has a permanently attached drive shaft 86 that is supported by two bearings 201. These bearings are mounted to a specially designed bracket 204 along with pulleys 202 and 350, and the entire assembly is bolted to the fan box rear panel 141. Heat slinger 200 is placed on shaft 86 to cool the bearings during operation.

Idle end fan 82 (FIG. 4) has a permanently attached drive shaft 85 that is supported by two bearings 201. These bearings are mounted to a specially designed bracket 206 along with pulley 205 and the entire assembly is bolted to the fan box rear panel 141. Heat slinger 200 is placed on shaft 85 to cool the bearings during operation.

Figure 4:
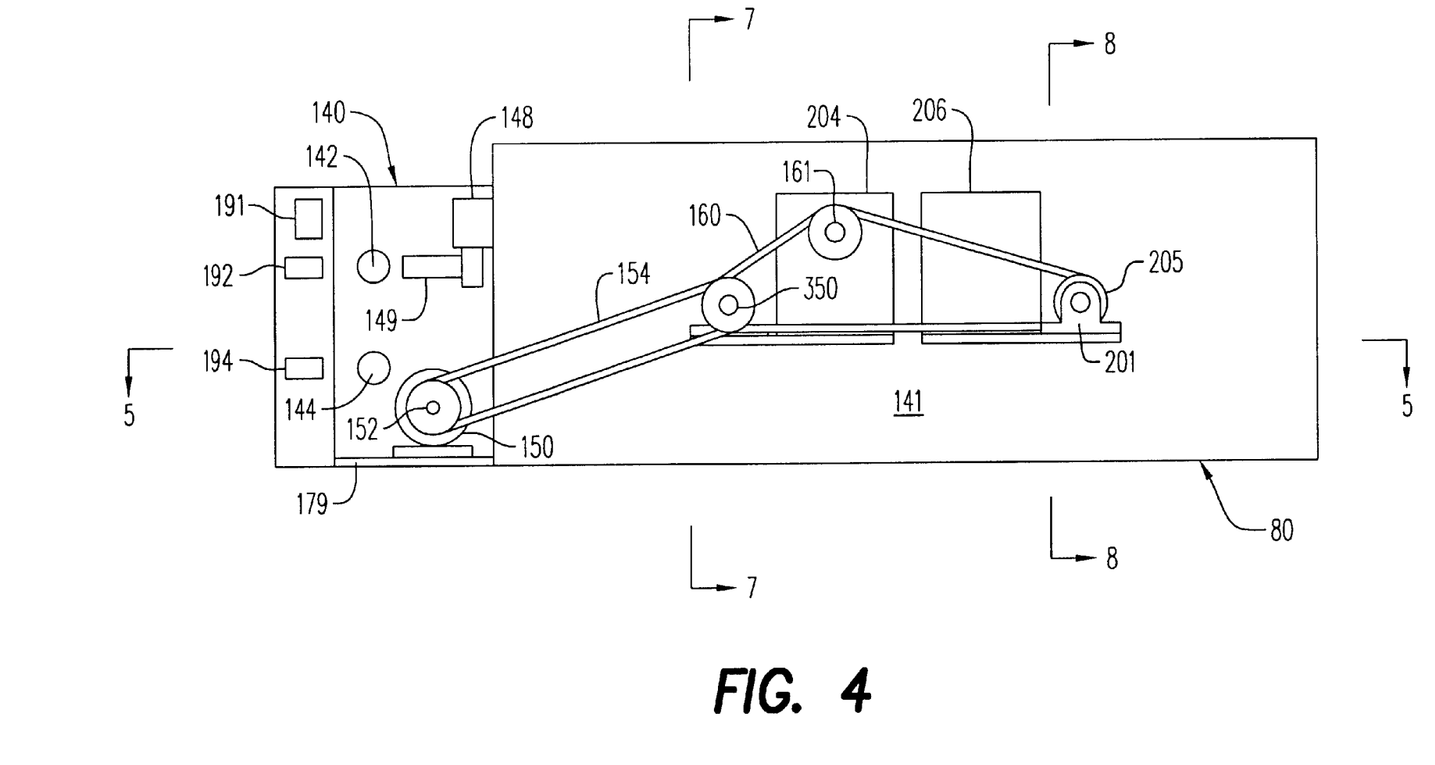
FIG. 4 is an elevation view as seen from the rear of the oven.

Rotational energy is provided to both centrifugal fans 82 and 84 by a single electric motor 150 using a pulley 152 and drive belt 154 (FIG. 4). Again, axial fans or the like may be substituted for centrifugal fans. Belt 154 rotates fan 84, and fan 82 also rotates as another belt 160 is driven off of drive end fan shaft 86 and pulley 202. Heat slinger 200 is placed on the motor 150 output shaft to provide air circulation within the drive end to cool sensitive electrical components. Belt 154 is tightened by moving motor 150 away from the fan box and belt 160 is tightened by moving idler pulley 161 vertically on bracket 204. An alternative embodiment for the fan drive means would be to have a separate motor drive each fan. However, the preferred embodiment of using a single motor to drive both fans reduces the number of moving parts in the oven and thus reduces the opportunity for future maintenance.

This novel design provides several advantages over the prior art. The first is an elimination of two fan drive motors per oven cavity. A single motor driving both fans will reduce service costs over the unit's service life. Second, the fans are mounted on separate drive shafts which allows easy removal and cleaning versus fans that are mounted on a common shaft. The heat slinger installed on the drive motor eliminates the need for separate electric cooling fans to circulate air within the control panel to cool sensitive electrical components. Again, a service expense reduction will be enjoyed by the end user.

Drive End Unit Details

FIGS. 1 and 4 show the drive end unit 140 that includes a welded steel frame 179, a rear panel 180, front panel 181 and top access panel 182. Enclosed in the drive end unit 140 is main blower motor 150, burner assembly 148, conveyor motors 142 and 144 with respective conveyor speed controllers 192 and 194 and bake chamber temperature control 191. The bottom of the drive end unit 140 is generally open to allow air to enter the compartment while louvers 147 in the rear panel 180 allow air to circulate freely. Heat slinger 200 provides air movement throughout the compartment when the main blower motor 150 is in operation.

Combustion air motor 149 provides forced air to burner 148 where it is mixed with gas and combusted. The combustion air motor 149 also has a manual means for controlling the air/gas mixture that in turns controls combustion efficiency. Combusted air is forced down burner tube 100 that travels the length of fan box 80 to re-heat spent air from the bake chamber.

Conveyor motors 144 and 142 provide rotational energy to conveyor assemblies 50 and 60 (FIGS. 1, 4). Female cogged couplings 72 are attached to drive motors 144 and 142 to provide easy installation and removal of the conveyor assemblies. Each conveyor motor 144 and 142 has a separate speed control 194 and 192 that may be turned on or off independent of the other control. Each conveyor motor 144 and 142 may be rotated either clockwise or counter clockwise.

Other Embodiments

Figure 9:
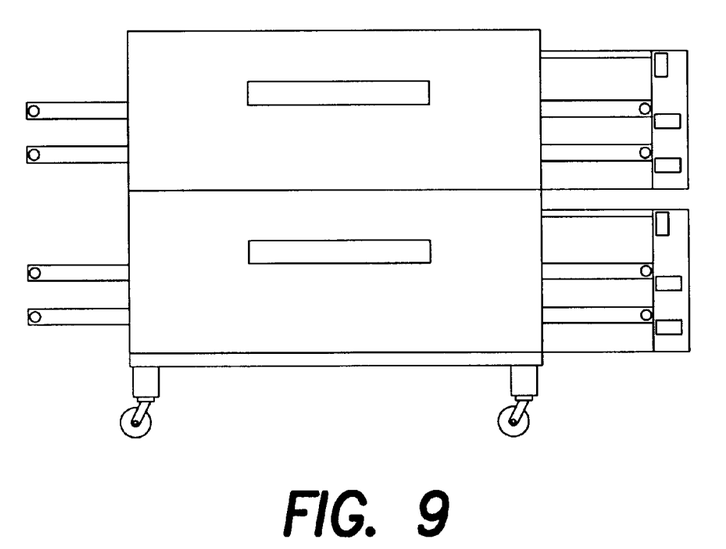
FIG. 9 is a front elevation view of a stack of dual conveyor ovens.
Figure 10:
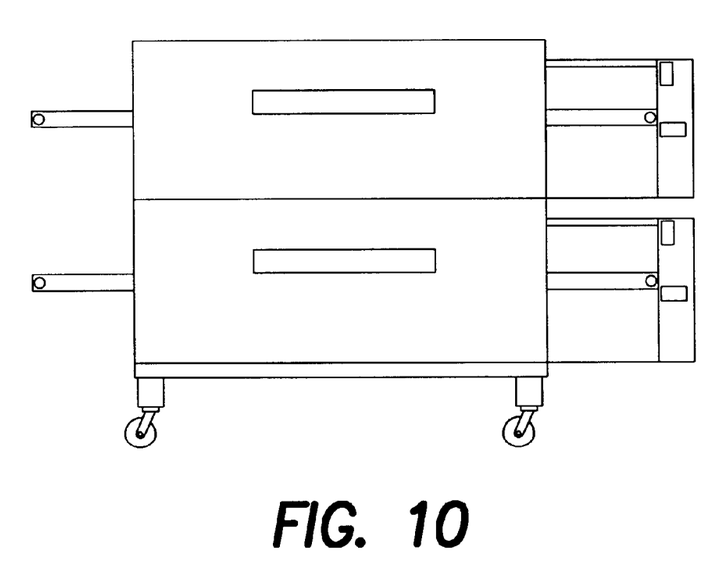
FIG. 10 is a front elevation view of another embodiment showing a stack of single conveyor ovens.
Figure 11:
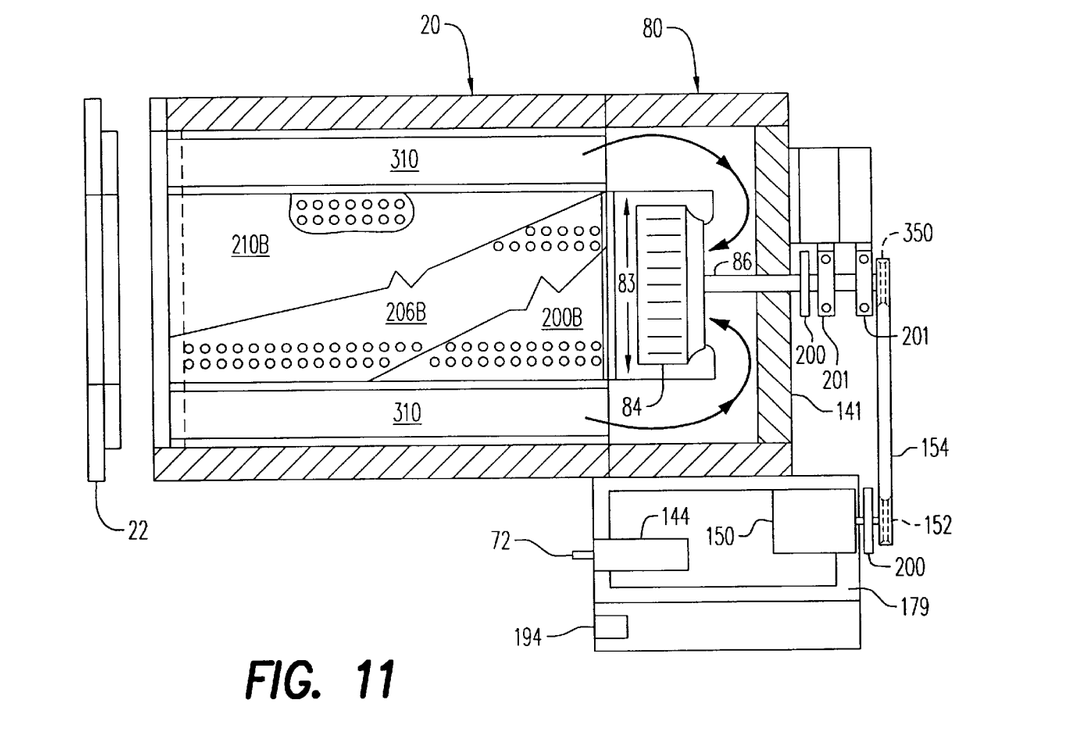
FIG. 11 is an overhead sectional view of another embodiment using only a single centrifugal fan.

FIG. 9 illustrates the stacking of two, dual conveyor ovens of the present invention, and FIG. 10 illustrates the stacking of two, single conveyor ovens of the present invention.

FIGS. 11, 12, 13 and 14 illustrate alternative embodiments according to the present invention. These embodiments feature the same novel airflow method, drive end configuration and burner means configuration while utilizing different combinations of single versus dual centrifugal fans, and single versus dual conveyor configurations.

Figure 15:
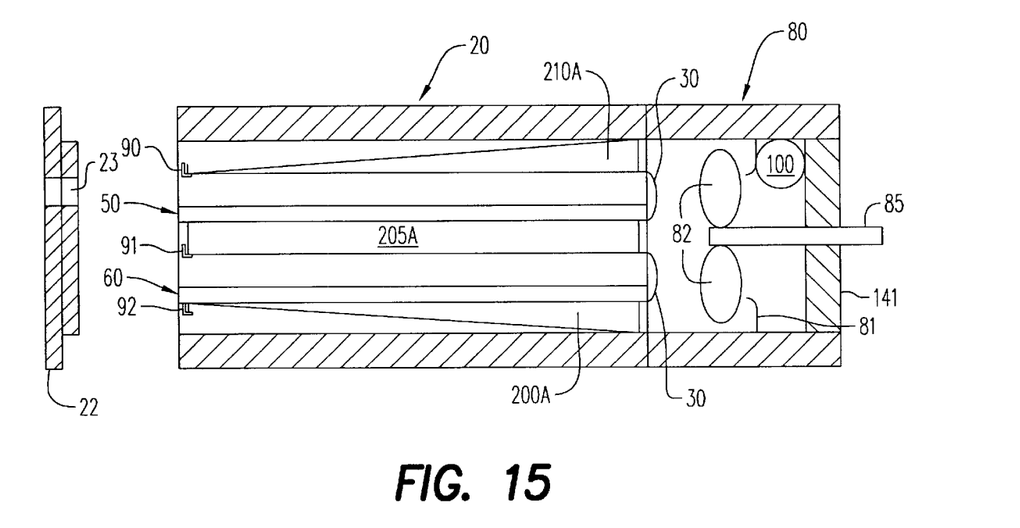
FIG. 15 is a sectional view of an embodiment using an axial fan taken along line 2—2 of FIG. 3.

FIG. 15 illustrates that an axial fan 82 can be utilized as the heated air delivery means.

Finally, although the preferred embodiment employs a gas-fired burner means, an electric-powered heating element could also be used to generate heat and provide the same heat transfer results.

Operation

In operation, the food product (i.e., pizza, bread, breadsticks, casseroles, etc.) is placed on the rotating conveyor(s) of the present invention and processed through the device. Using the controls for the burner and conveyor speed, the operator can set the cooking temperature to between about 250° F. to about 600° F., and the cooking time to between about 2 minutes to about 20 minutes.

The skilled reader being aware of the versatility of this preferred embodiment may envision many modifications and variations that are not limited to only those listed above. Accordingly, the reader should understand that these modifications and variations, and the equivalents thereof, are within the spirit and scope of this invention as defined by the following claims.

I claim:

1. A conveyor oven, comprising:
   a. a bake chamber having front, back, right and left sides and having at least one continuous opening through the right and left sides;
   b. at least a first and a second conveyor disposed in stacked relation and within and extending through the at least one opening, said first and second conveyors having a direction of movement associated therewith;
   c. a heated air delivery mechanism comprising a fan box, a first manifold arrangement disposed above said first conveyor, a second manifold arrangement disposed between said first and second conveyors and a third manifold arrangement disposed below said second conveyor, and at least one centrifugal fan disposed in said fan box adjacent a front wall thereof, said centrifugal fan comprising a suction opening and at least one distribution opening and having a rotational axis perpendicular to the direction of movement of said first and second conveyors;
   d. a burner tube parallel to the direction of movement of the conveyor and disposed between a rear wall of said fan box and said suction opening of said at least one fan; and
   e. a plurality of air return passages in fluid communication with said fan box, wherein said fan draws return air into said suction opening via said return passages and said burner tube and provides a substantially uniform pressure heated air stream via said at least one distribution opening to said first, second and third manifold arrangements.

2. The conveyor oven as recited in claim 1, wherein each of said first, second and third manifold arrangements includes at least first and second spaced apart fingers, and wherein said plurality of air return passages are disposed to return air centrally and between said first and second spaced apart fingers of said first, second and third manifold arrangements.

3. The conveyor oven as recited in claim 2, wherein said fingers direct heated air vertically onto each conveyor.

4. The conveyor oven as recited in claim 1 further comprising an aperture in the front side of the oven, which allows a food product to be placed on the conveyor at a midpoint of the bake chamber.

5. The conveyor oven as recited in claim 1 wherein the air delivery mechanism comprises two centrifugal fans having separate drive shafts shared by a common motor.

6. The conveyor oven as recited in claim 1, wherein said second manifold arrangement comprises at least one finger that includes an upper plate with a plurality of air holes that direct heated air toward a bottom of said first conveyor, a bottom plate with a plurality of air holes that directs heated air toward a top of said second conveyor, and an internal baffle that directs the heated air toward said upper and lower plates.

7. The conveyor oven as recited in claim 1, wherein said plurality of air return passages comprise separate plenums disposed along an outer edge of each of said first, second and third manifold arrangements.

8. The conveyor oven as recited in claim 7, wherein said plurality of air return passages further comprises at least one air return passage centrally disposed with respect to said outer edges of said first, second and third manifold arrangements.

9. The conveyor oven as recited in claim 1, wherein said suction opening is a sole suction opening of said centrifugal fan that faces away from said bake chamber.

10. The conveyor oven as recited in claim 1, wherein said burner tube is so disposed in said fan box to heat said return air just prior to entry into said suction opening.

11. The conveyor oven as recited in claim 1, wherein said heated air stream is non-swirling.

12. The conveyor oven of claim 1, wherein said centrifugal fan further comprises a backward-inclined fan blade.

13. The conveyor oven as recited in claim 1, wherein at least one of said first, second and third manifold arrangements includes an elliptical air guide to facilitate air stream movement with low resistance.

14. A conveyor oven comprising:
   a bake chamber having front, back, right and left sides and having at least one continuous opening through the right and left sides;
   at least a first and a second conveyor disposed in stacked relation and within and extending through the at least one opening, said first and second conveyors having a direction of movement associated therewith;
   a heated air delivery mechanism that is in fluid communication with said bake chamber and a fan box and that comprises a first manifold arrangement disposed above said first conveyor, a second manifold arrangement disposed between said first and second conveyors and a third manifold arrangement disposed below said second conveyor, and a plurality of air return passages;
   at least one centrifugal fan disposed in said fan box adjacent a front wall thereof, said centrifugal fan comprising a sole suction opening that faces away from said bake chamber, at least one distribution opening and a rotational axis perpendicular to the direction of movement of said first and second conveyors; and
   a burner tube disposed in said fan box and parallel to the direction of movement of the conveyor, wherein said centrifugal fan draws return air into said sole suction opening via said return passages and provides a substantially uniform pressure heated air stream via said distribution opening to said first, second and third manifold arrangements, wherein said burner tube is so disposed in said fan box to heat said return air prior to entry into said sole suction opening, and wherein at least one of said first, second and third manifold arrangements includes an elliptical air guide to facilitate air stream movement with low resistance.

15. The conveyor oven of claim 14, wherein said heated air stream is non-swirling.

16. The conveyor oven of claim 14, wherein said centrifugal fan further comprises a backward-inclined fan blade.

17. A conveyor oven comprising:

a bake chamber having front, back, right and left sides and having at least one continuous opening through the right and left sides;

at least a first and a second conveyor disposed in stacked relation and within and extending through the at least one opening, said first and second conveyors having a direction of movement associated therewith;

a heated air delivery mechanism that is in fluid communication with said bake chamber and a fan box and that comprises a first manifold arrangement disposed above said first conveyor, a second manifold arrangement disposed between said first and second conveyors and a third manifold arrangement disposed below said second conveyor, and a plurality of air return passages;

at least one centrifugal fan disposed in said fan box adjacent a front wall thereof, said centrifugal fan comprising a sole suction opening that faces away from said bake chamber, at least one distribution opening and a rotational axis perpendicular to the direction of movement of said first and second conveyors; and a burner tube disposed in said fan box and parallel to the direction of movement of the conveyor, wherein said centrifugal fan draws return air into said sole suction opening via said return passages and provides a substantially uniform pressure heated air stream via said distribution opening to said first, second and third manifold arrangements, wherein said burner tube is so disposed in said fan box to heat said return air prior to entry into said sole suction opening, and wherein said burner tube is disposed to a rear of said centrifugal fan.

18. A conveyor oven comprising:

a bake chamber having right and left sides and having at least one continuous opening through the right and left sides;

a conveyor disposed within and extending through the at least one opening;

a heated air delivery mechanism that is in fluid communication with said bake chamber and a fan box and that comprises a manifold arrangement disposed above and/or below said conveyor, and an air return passage;

a fan disposed in said fan box; and a heater element disposed in said fan box, wherein said fan draws return air via said air return passage and provides a substantially uniform pressure air stream to said manifold arrangement, wherein said heater element and fan are so disposed in said fan box to heat said air stream, and wherein said manifold arrangement includes an elliptical air guide to facilitate air stream movement with low resistance.

* * * * *